(12) United States Patent
Immerman

(10) Patent No.: US 6,886,792 B2
(45) Date of Patent: May 3, 2005

(54) SUCTION CUP HOLDER

(75) Inventor: Robert A. Immerman, Shaker Heights, OH (US)

(73) Assignee: InterDesign, Inc, Solon, OH (US)

( * ) Notice: Subject to any disclaimer, the term of this patent is extended or adjusted under 35 U.S.C. 154(b) by 0 days.

(21) Appl. No.: 09/822,154

(22) Filed: Mar. 30, 2001

(65) Prior Publication Data

US 2002/0139911 A1 Oct. 3, 2002

(51) Int. Cl.[7] .............................................. F16B 47/00
(52) U.S. Cl. ........................ 248/206.3; 248/206.2; 248/206.4; 248/302; 248/303; D6/524; D6/525; D6/566; 211/87.01; 211/106
(58) Field of Search .......................... D6/524, 525, 566; 248/206.3, 206.2, 206.4, 302, 303, 683, 362; 211/106, 87.01, 119; 362/397

(56) References Cited

U.S. PATENT DOCUMENTS

| | | | | |
|---|---|---|---|---|
| 192,408 A | * | 6/1877 | Batt ........................ 248/231.31 |
| 1,230,242 A | * | 6/1917 | Von Unruh ................ 211/57.1 |
| 1,531,694 A | * | 3/1925 | Downing ................. 116/28 R |
| 2,185,299 A | * | 1/1940 | Heraty ......................... 211/87 |
| D121,813 S | * | 8/1940 | Isenberg ...................... D6/537 |
| D167,234 S | * | 7/1952 | Simpson ...................... D6/537 |
| D194,307 S | * | 1/1963 | Raphael .......................... D4/3 |
| 3,181,702 A | * | 5/1965 | Raphael ........................ 211/119 |
| 3,186,671 A | * | 6/1965 | Standley ...................... 248/224 |
| D210,833 S | * | 4/1968 | Cura ............................ D6/320 |
| 3,789,996 A | * | 2/1974 | Stroh ........................... 211/106 |
| D237,674 S | * | 11/1975 | Seltzer et al. ................. D6/566 |
| 4,060,214 A | * | 11/1977 | Metcalf ......................... 248/165 |
| 4,779,829 A | | 10/1988 | Rocke et al. |
| D302,223 S | * | 7/1989 | Joss et al. ..................... D6/524 |
| 5,028,026 A | * | 7/1991 | Philipps et al. ........... 248/206.1 |
| 5,039,046 A | * | 8/1991 | Brewster .................... 248/206.3 |
| D330,290 S | * | 10/1992 | Edwards ....................... D6/323 |
| D332,390 S | * | 1/1993 | Adams ......................... D8/373 |
| 5,313,337 A | | 5/1994 | Byers |
| 5,588,543 A | * | 12/1996 | Finger ....................... 211/90.01 |
| 5,595,364 A | * | 1/1997 | Protz, Jr. .................. 248/205.5 |
| 5,611,511 A | * | 3/1997 | Lee ........................... 248/205.5 |
| 5,620,105 A | * | 4/1997 | Macek ......................... 211/119 |
| 5,657,954 A | * | 8/1997 | Emery et al. ............. 248/206.3 |
| D395,184 S | * | 6/1998 | St-Pierre et al. ............. D6/517 |
| D397,567 S | * | 9/1998 | Hofman ....................... D6/525 |
| 5,803,655 A | * | 9/1998 | Furuya ........................ 403/398 |
| 5,862,816 A | | 1/1999 | Lowe |
| 5,887,731 A | * | 3/1999 | Thalenfeld ................. 211/57.1 |
| 5,893,543 A | | 4/1999 | Emery et al. |
| D423,327 S | * | 4/2000 | Ades ............................ D8/354 |
| 6,089,387 A | * | 7/2000 | Varfolomeeva ........... 211/181.1 |
| D442,002 S | * | 5/2001 | Rodack ........................ D6/566 |
| D449,479 S | * | 10/2001 | Snell ............................ D6/562 |
| D449,752 S | * | 10/2001 | Snell ............................ D6/537 |
| D450,213 S | * | 11/2001 | Snell ............................ D6/566 |
| D453,651 S | * | 2/2002 | Snell ............................ D6/537 |

* cited by examiner

Primary Examiner—Kimberly Wood
(74) Attorney, Agent, or Firm—D. Peter Hochberg; Sean Mellino; Katherine R. Vieyra

(57) ABSTRACT

The present invention provides an attachment system for a suction cup and a fixture, including a resilient suction cup and a wire fixture. This attachment means quickly and securely attaches the suction cup to the fixture, enabling the fixture, when secured to a smooth surface by the suction cups, to hold heavy objects.

A preferred embodiment of the invention includes a pair of parallel, horizontal rigid wires separated by a distance smaller than the head of a resilient suction cup but larger than the neck of the cup. The head of the cup is compressed to fit it between the pair of wires, which hold the neck and the entire suction cup in place. A pair of transverse wires intersecting the horizontal wires limit the horizontal movement of the cup.

3 Claims, 2 Drawing Sheets

SUCTION CUP HOLDER

BACKGROUND OF THE INVENTION

1. Field of the Invention

This invention relates to an attachment system for attaching a suction cup and a fixture, and it more particularly relates to an attachment system for attaching a suction cup made from a resilient material such as plastic or rubber to a fixture made from metal or other material.

2. Description of the Prior Art

Suction cups attached to fixtures enabling the fixtures to be attached to smooth surfaces are well known in the art and widely used. Such suction cups could be attached to fixtures such as wire baskets, plastic baskets, garbage bag holders, wire or plastic shelves, soap dishes, soap holders, scouring pad holders, bottle holders, eyeglass holders, glare shields, support lights, plastic cups or cup dispensers, bathroom accessories such as toothbrush holders and razor holders, wire frame shower hangers, shower seats, shower personal hygiene support systems, a shower caddy, corner mounted trays and the like. There are various means known in the art for incorporating suctions cups with fixtures. In U.S. Pat. No. 5,893,543, various locking devices for supporting suction cups or holding them in place are disclosed. U.S. Pat. No. 5,862,816 shows a razor holder having slots with a rounded end which slips over the neck of a suction cup while U.S. Pat. No. 5,313,337 shows a wire form product with open loops for holding the necks of suction cups, as does the eyeglass holder in U.S. Pat. No. 4,779,829. The bottle holder of U.S. Pat. No. 5,039,046 uses metal wires to engage the suction cups. One problem with many of these fixtures and their attached suction cups is that the suction cups are difficult to attach securely to the fixture. Another problem is that, after the suction cup is attached to the fixture, the resulting apparatus is difficult to package and ship. Often, however, the attachment system is complicated to manufacture, particularly in an efficient and practical manner.

SUMMARY OF THE INVENTION

It is an object of the present invention to provide an attachment system for a suction cup and a fixture.

Another object of the present invention is to provide an attachment system for a resilient suction cup and a wire fixture.

Still another object of the present invention is to provide attachment means for quickly and securely attaching the suction cup to the fixture.

Another object of the present invention is to provide an attachment system for a resilient suction cup and a fixture such that the attachment is inexpensive to manufacture, easy and economical to produce and assemble and attractive in appearance.

Still another object of the present invention is to provide an attachment system for a suction cup and a fixture such that the resulting attachment is strong, enabling the fixture, when secured to a smooth surface by the suction cups, to hold heavy objects.

Other objects will be apparent from the description to follow and from the appended claims.

The foregoing objects are achieved according to a preferred embodiment of the invention by means of a pair of parallel, horizontal rigid wires separated by a distance smaller than the head of a resilient suction cup but larger than the neck of the cup. The head of the cup is compressed to fit it between the pair of wires, which hold the neck and the entire suction cup in place. A pair of transverse wires intersecting the horizontal wires limit the horizontal movement of the cup.

DESCRIPTION OF THE PREFERRED EMBODIMENTS

Figure 3:
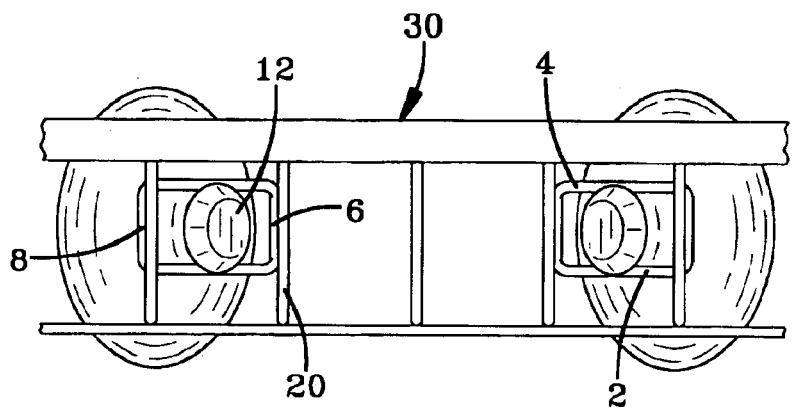
FIG. 3 is a rear view of the suction cup holder attached to a fixture holding a suction cup.
Figure 4:
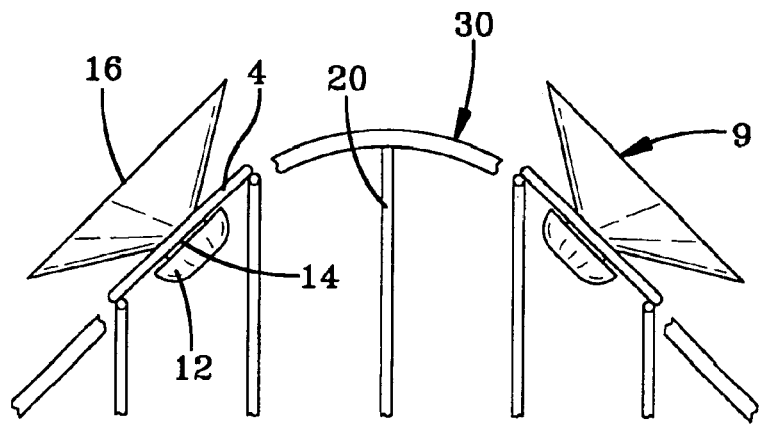
FIG. 4 is a top view of the suction cup holder attached to a fixture holding a suction cup.
Figure 5:
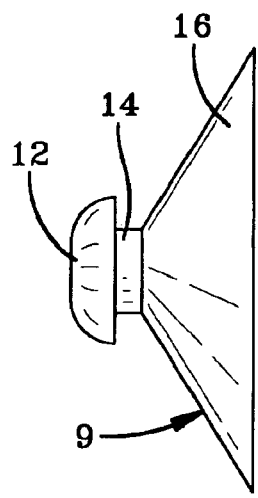
FIG. 5 is a side elevation view of a suction cup.

The preferred embodiments of the invention described below comprise an attachment system as shown in the drawings comprising a four sided wire apparatus 1 having opposing parallel elongated support members or wires, preferably made from cylindrical, rigid metal wire, but possibly also made from other materials such as plastic or wood. This apparatus has a bottom horizontal wire 2 which is generally parallel to a top horizontal wire 4, and two parallel, transverse side wires 6 and 8 which are perpendicular to the top wire 4 and bottom wire 2; the four wires connect and form the rectangularly shaped attachment system. This system attaches a suction cup 9 to a device or fixture 30 by attaching each of the two transverse side wires 6 and 8 to a pair of adjacent wire struts or supports 20 which extend between at least one of the horizontal wire supports of the fixture 30 as shown in FIG. 3. The suction cup is comprised of a neck 14, an engaging member 16 comprised of a flexible concave surface for engaging flat surfaces and is molded onto one end of the neck 14, and a flexible disc-shaped engagement portion or capture button or head 12 molded onto the other end of the neck 14. The diameter of the head 12 exceeds that of the neck 14. The opening 10 in the apparatus 1 is smaller than the diameter of the head 12, but larger than that of neck 14 of the suction cup 9 which makes it easy to assemble. This opening 10 is large enough to enable the head 12 when compressed or folded to pass through yet small enough to prevent the head 12 from slipping out after it is inserted and decompressed. In the attachment system, the head 12 of the suction cup 9 is compressed and pushed through the opening 10 in the apparatus 1. Once through the opening 10, the head 12 expands and the neck 14 is retained in the apparatus 1, securing the suction cup 9 to the fixture 30.

The invention is particularly advantageous for formed metal goods or fixtures such as containers, baskets or shelves. The invention would apply to other materials as well, such as wood or plastic and the like. The invention could be used on virtually any size suction cup and fixture.

Variations in the foregoing description fall within the invention. If the neck is large enough to engage the horizontal wires, or if sideways movement is not objectionable, the transverse wires may not be necessary.

Figure 7:
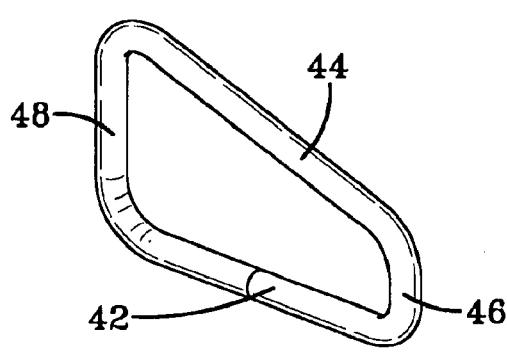
FIG. 7 is a perspective view of an additional embodiment.
Figure 6:
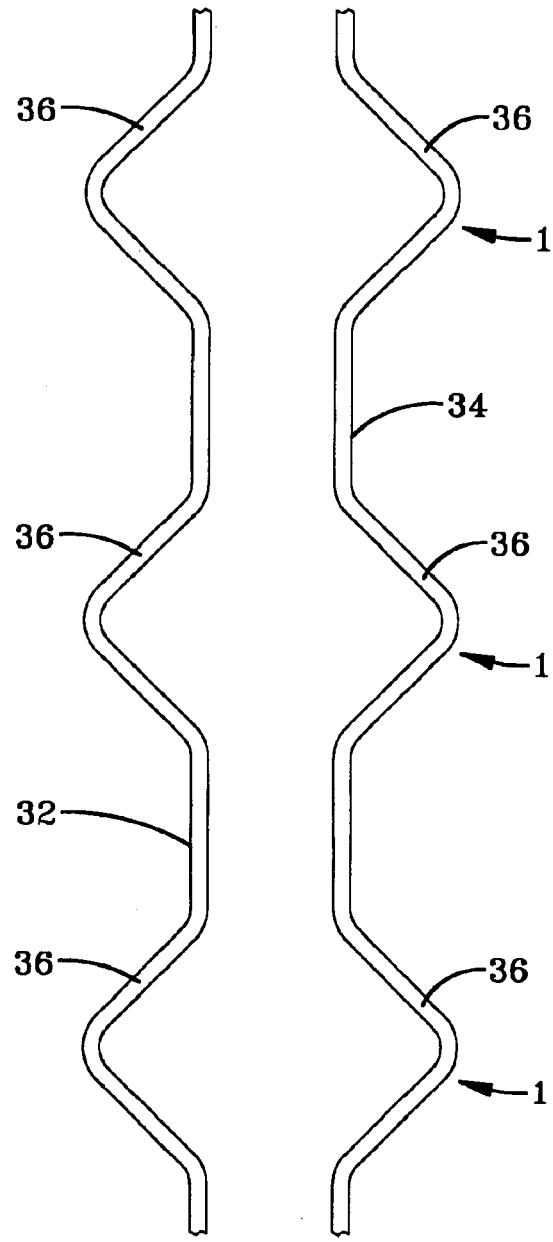
FIG. 6 is a top view of an additional embodiment.

The two opposing wires, 32 and 34, also can be vertical as shown in FIG. 6. In this embodiment, each wire contains a horizontal, v-shaped bend 36 and the bends are directly across from each other. The pair of wires could be at any angle, depending on the size and physical characteristics of the suction cups. In another embodiment, shown in FIG. 7, the wires vary from being parallel, enabling them to accept suction cups having different neck sizes. Here the top wire 44 is not parallel to the bottom wire 42 while the right wire 46 and the left wire 48 are parallel.

Figure 1:
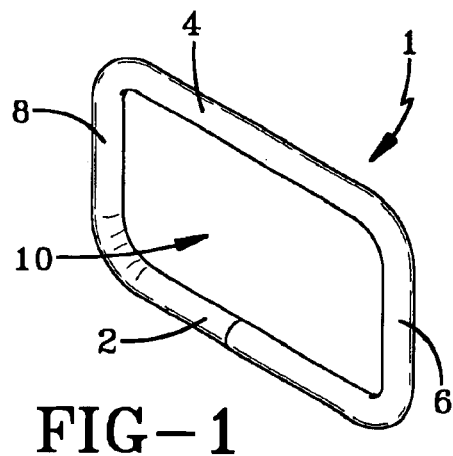
FIG. 1 is a perspective view of the suction cup holder.
Figure 2:
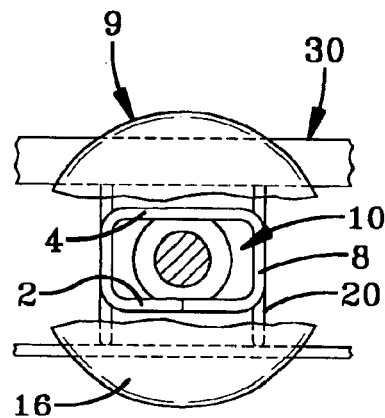
FIG. 2 is a front view of a suction cup installed on the fixture with a portion cut away to reveal a detailed portion of the fixture and suction cup holder with suction cup attached thereto.

When the invention is used on wire form products, welding, soldering or brazing are appropriate construction techniques for the device. Attachment techniques or fastener arrangements such as welding, soldering or brazing can be used to attach the wire form to the wire apparatus 1. More than one fastening arrangement can be used. FIG. 2 clearly illustrates one fastening arrangement at transverse side wire 6 and a second fastening arrangement at transverse side 8. When plastic is used, the attaching device could be integrally formed by molding. It is possible to use adhesives to construct the device when it is made from metal, plastic or wood.

Although device 30 is shown as a container, it could be any device holdable by suction cups. Of course, the attaching device could be constructed to accompany any number of suction cups.

The invention has been described in detail with particular emphasis being placed on the preferred embodiments thereof, but variations and modifications within the spirit and scope of the invention may occur to those skilled in the art to which the invention pertains.

I claim:

1. A wire form fixture made of metal wires, said fixture having at least one horizontal wire supports forming a shelf surrounded by vertical walls, said vertical walls each having composed of parallel, vertical wires, at least four vertical, parallel wires forming a section generally lying in a vertical plane and at least one suction cup holding apparatus; a resilient suction cup, the suction cup having a suction body and a neck extending from the body with an enlarged head, said suction cup holding apparatus being attached to two adjacent vertical, parallel wires of at least one or said sections releasably holding the neck of the suction cup, said at least one suction cup holding apparatus comprising:

a piece of metal wire bent in the form of a rectangle with rounded corners, said rectangle being dimensional to be both of sufficient size to enable the head of the suction cup to be forced into the rectangle and to hold the neck of the suction cup to retain the suction cup in the rectangle, and to prevent the head from slipping from the rectangle, said apparatus being attached to said two adjacent parallel wires of said section with one pair of opposing parallel sides of said apparatus being parallel to said parallel wires of said section and the other pair or opposing parallel sides of said apparatus being perpendicular to said parallel wires of said section.

2. A wire form fixture according to claim 1 wherein said at least one suction cup holding apparatus comprises at least two suction cup holding apparatuses, and two of said apparatuses being located on said section and being symmetrically disposed said section.

3. A wire form fixture made of metal wires, said fixture having at least one horizontal wire supports forming a shelf surrounded by vertical walls, said vertical walls each being composed of parallel, vertical wires, at least four vertical, parallel wires forming a section generally lying in a vertical plane and at least one suction cup holding apparatus; a resilient suction cup, the suction cup having a suction body and a neck extending from the body with an enlarged head, said suction cup holding apparatus being attached to two adjacent vertical, parallel wires of at least one of said sections releasably holding the neck of the suction cup, said at least one suction cup holding apparatus comprising:

a piece of metal wire bent in the form of a rectangle with rounded corners, said rectangle being dimensional to be both of sufficient size to enable the head of the suction cup to be forced into the rectangle and to hold the neck of the suction cup to retain the suction cup in the rectangle, and to prevent the head from slipping from the rectangle, said apparatus being attached to said two adjacent parallel wires of said section with one pair of opposing parallel sides of said apparatus being parallel to said parallel wires of said section and the other pair of opposing parallel sides of said apparatus being perpendicular to said parallel wires of said section, wherein said fixture is supportable on a vertical wall solely by the suction cup.

* * * * *

UNITED STATES PATENT AND TRADEMARK OFFICE
CERTIFICATE OF CORRECTION

| | | |
|---|---|---|
| PATENT NO. | : 6,886,792 B2 | Page 1 of 1 |
| APPLICATION NO. | : 09/822154 | |
| DATED | : May 3, 2005 | |
| INVENTOR(S) | : Robert A. Immerman and Russell Benton Snell | |

It is certified that error appears in the above-identified patent and that said Letters Patent is hereby corrected as shown below:

On the title page, item: (75) Inventors: should be Robert A. Immerman, Shaker Heights OH (US); --Russell Benton Snell, Bentleyville OH (US) --

Signed and Sealed this

Fourth Day of September, 2007

JON W. DUDAS
*Director of the United States Patent and Trademark Office*